US011209258B2

(12) United States Patent
Styles et al.

(10) Patent No.: US 11,209,258 B2
(45) Date of Patent: Dec. 28, 2021

(54) MACHINE TOOL APPARATUS

(71) Applicant: RENISHAW PLC, Wotton-under-Edge (GB)

(72) Inventors: John Anthony Styles, Bristol (GB); Paul Anthony Taylor, Stroud (GB); Derek Marshall, Hawkesbury Upton (GB)

(73) Assignee: RENISHAW PLC, Wotton-under-Edge (GB)

( * ) Notice: Subject to any disclaimer, the term of this patent is extended or adjusted under 35 U.S.C. 154(b) by 157 days.

(21) Appl. No.: 16/477,345

(22) PCT Filed: Jan. 17, 2018

(86) PCT No.: PCT/GB2018/050130
§ 371 (c)(1),
(2) Date: Jul. 11, 2019

(87) PCT Pub. No.: WO2018/134585
PCT Pub. Date: Jul. 26, 2018

(65) Prior Publication Data
US 2019/0376777 A1    Dec. 12, 2019

(30) Foreign Application Priority Data

Jan. 18, 2017 (GB) .................................... 1700879

(51) Int. Cl.
*G01B 5/008* (2006.01)
*G01B 21/04* (2006.01)
*G05B 19/402* (2006.01)

(52) U.S. Cl.
CPC ........... *G01B 5/008* (2013.01); *G01B 21/047* (2013.01); *G05B 19/402* (2013.01); *G01B 2210/58* (2013.01); *G05B 2219/37231* (2013.01)

(58) Field of Classification Search
CPC .............................. G01B 5/008; G05B 19/402
(Continued)

(56) References Cited

U.S. PATENT DOCUMENTS 4,882,848 A    11/1989 Breyer et al.
5,228,352 A    7/1993 McMurtry et al.
(Continued)

FOREIGN PATENT DOCUMENTS

CA    2808781 A1    9/2013
CN    1856691 A    11/2006
(Continued)

OTHER PUBLICATIONS

May 31, 2017 British Search Report issued in British Patent Application No. 1700879.8.
(Continued)

*Primary Examiner* — George B Bennett
(74) *Attorney, Agent, or Firm* — Oliff PLC

(57) ABSTRACT

A touch trigger probe interface for a machine tool is described that includes a probe communication portion for receiving probe event information from a touch trigger probe. A machine tool communication portion is also provided for outputting probe event information to a numerical controller of the machine tool. The machine tool communication portion outputs the probe event information as digital data packets, for example over a digital data bus. The digital data packets may include a time stamp and/or the touch trigger probe interface may receive timing information from the machine tool. A touch trigger probing system and a machine tool system including the probe interface are also described.

21 Claims, 4 Drawing Sheets

Figure 1:
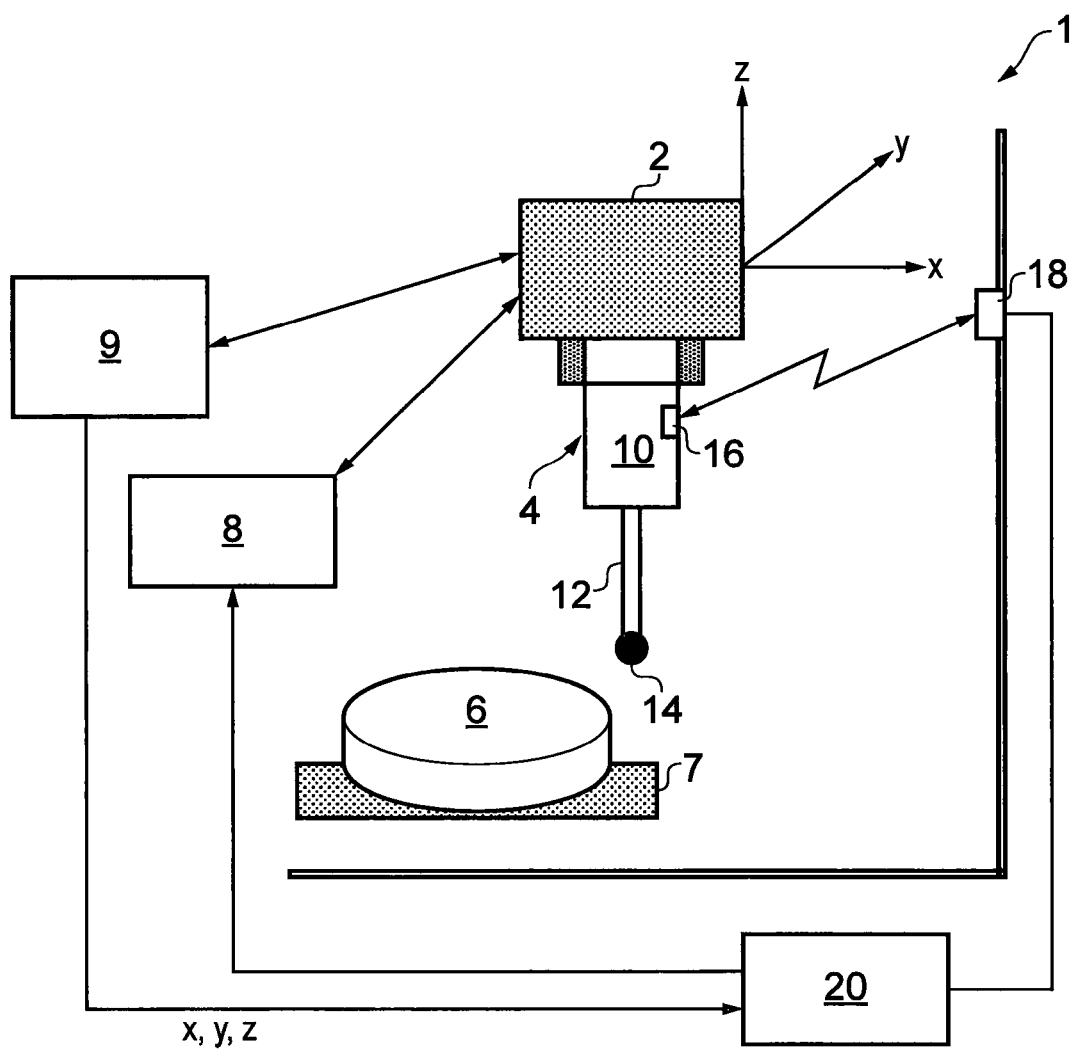

(58) Field of Classification Search
USPC .......................................................... 33/504
See application file for complete search history.

(56) References Cited

U.S. PATENT DOCUMENTS

| | | | |
|---|---|---|---|
| 7,523,561 B2 | 4/2009 | McFarland | |
| 7,665,219 B2* | 2/2010 | Styles | G01B 21/047 |
| | | | 33/503 |
| 8,474,150 B2* | 7/2013 | Groell | H04Q 9/00 |
| | | | 33/558 |
| 2004/0134085 A1* | 7/2004 | Fuge | G01D 3/08 |
| | | | 33/556 |
| 2005/0072015 A1* | 4/2005 | Groell | G01B 5/012 |
| | | | 33/558 |
| 2007/0245584 A1 | 10/2007 | Hagl et al. | |
| 2008/0051927 A1 | 2/2008 | Prestidge et al. | |
| 2009/0028286 A1* | 1/2009 | Prestidge | G01B 5/008 |
| | | | 377/15 |
| 2009/0049704 A1 | 2/2009 | Styles et al. | |
| 2011/0276303 A1* | 11/2011 | Marshall | G01B 21/047 |
| | | | 702/141 |
| 2013/0331986 A1 | 12/2013 | Tait et al. | |
| 2016/0195382 A1* | 7/2016 | McMurtry | G01B 21/045 |
| | | | 33/503 |
| 2018/0107190 A1* | 4/2018 | Marshall | G01B 21/042 |

FOREIGN PATENT DOCUMENTS

| | | |
|---|---|---|
| CN | 101287958 B | 11/2010 |
| CN | 104917757 A | 9/2015 |
| EP | 1880163 B1 | 1/2008 |
| EP | 2214147 A1 | 8/2010 |
| GB | 1586052 A | 3/1981 |
| WO | 2004/057552 A1 | 7/2004 |
| WO | 2005/065884 A2 | 7/2005 |
| WO | 2007/028964 A1 | 3/2007 |
| WO | 2008/102109 A1 | 8/2008 |
| WO | 2013/182909 A1 | 12/2013 |
| WO | 2014/075763 A1 | 5/2014 |

OTHER PUBLICATIONS

Apr. 9, 2018 International Search Report issued in International Patent Application No. PCT/GB2018/050130.

Apr. 9, 2018 Written Opinion of the International Searching Authority issued in International Patent Application No. PCT/GB2018/050130.

* cited by examiner

MACHINE TOOL APPARATUS

The present invention relates to apparatus for a machine tool and in particular to an improved touch trigger probe interface for a machine tool. The invention also relates to a probing system and machine tool that incorporate such a touch trigger probe interface.

Computer Numerically Controlled (CNC) machine tools are widely used in manufacturing industry to cut parts. Such machine tools can also include measurement devices that allow parts or tools to be measured for set-up or inspection purposes. Touch trigger probes, which are sometimes also termed digital probes, are one known type of measurement device. In particular, it is known to mount a touch trigger probe having a protruding stylus in the spindle of a machine tool to allow workpieces to be measured. In such an example, the touch trigger probe simply acts as a switch and deflection of its stylus (e.g. when the stylus tip is moved into contact with the surface of an object) causes a trigger signal to be issued. The machine tool measures the position of the touch trigger probe in the machine coordinate system (x,y,z) at the instant the trigger signal is issued, thereby allowing (with suitable calibration) the position of a point on the surface of the object to be measured. A touch trigger probe can thus be repeatedly driven into, and out of, contact with the surface of a workpiece to take point-by-point position measurements of that workpiece.

An example of a touch trigger probe system is described in WO2004/057552. This system comprises a touch trigger probe that can be carried in the spindle of a machine tool and an associated probe interface that can be mounted to an immovable part of the machine tool. If the touch trigger probe is "triggered" (e.g. if its stylus contacts an object), a trigger signal is passed to the probe interface over a wireless (radio) link. The probe interface also has an output line that is hardwired to the SKIP input of the machine tool controller. On receipt of the trigger signal from the touch trigger probe, the probe interface issues a SKIP signal to the controller by changing the state of its output line that is connected to the SKIP input (e.g. by raising it from a low voltage to a high voltage, or vice versa). The controller, on receipt of this SKIP signal, latches or records the current position of the touch trigger probe in the machine coordinate system (e.g. in x, y, z co-ordinates).

In the system described above there will be, for a variety of reasons, a time delay between the actual trigger event (e.g. the stylus physically deflecting due to touching a point on the surface of the object) and the issuance of the SKIP signal by the probe interface. A significant proportion of this time delay may arise from time filtering schemes used within the touch trigger probe to reduce false triggers or because the wireless communications protocol used to transmit the trigger information from the touch trigger probe to the probe interface requires a delay (e.g. for robustness reasons). The software within the machine tool controller which processes the SKIP signal will, as part of a calibration procedure, generate a position offset to account for such a time delay. This position offset enables the actual position in the machine coordinate position where the probe was triggered to be established. It should be noted that this correction process requires the time delay to be constant; this is because any variability in the time delay will introduce a measurement error. To date, touch trigger probe systems have thus been designed to produce a time delay that is as invariant as possible (i.e. to ensure the SKIP signal is issued at a fixed time interval after the occurrence of the trigger event).

The present inventors have, however, found that the position correction that is used to account for the above described time delay is not always sufficiently accurate. In particular, the position correction calculation assumes a constant machine velocity during the probing move in order to convert the time delay into a positional offset. However, in certain circumstances, the velocity of the touch trigger probe is not constant and the positional correction has thus been found to be inaccurate thereby introducing a source of measurement error. This has been found to be the case even on otherwise very accurate machines where sub-micron positioning is possible. This is thought to arise because the machine tool controller is usually programmed to follow the correct toolpath as accurately as possible (i.e. so it would cut an object to the desired shape) rather than ensuring the machine tool spindle is always in the commanded place at the commanded time.

According to a first aspect of the invention, there is provided a touch trigger probe interface for a machine tool, comprising a probe communication portion for receiving probe event information from a touch trigger probe and a machine tool communication portion for outputting probe event information to a numerical controller of the machine tool, characterised in that the machine tool communication portion outputs the probe event information as digital data packets.

The present invention thus provides a touch trigger probe interface that is used in combination with a machine tool. The probe interface has a probe communication portion that allows it to receive, for example over a wireless communications link, probe event information from an associated touch trigger probe. The communications link between the probe and the probe interface may comprise a digital wireless transmission system, such as the spread spectrum communication system described in WO2004/057552. The probe interface also has a machine tool communication portion for outputting probe event information to a numerical controller of the associated machine tool. The probe event information relayed from the touch trigger probe to the numerical controller by the touch trigger probe interface may, for example, be information indicating that a trigger event has occurred due to the touch trigger probe being moved into a certain positional relationship with the surface of an object.

It is important to note here that a touch trigger probe could indicate a probe event (e.g. a trigger event) has occurred at any point in time. The time the probe event occurred, not merely the fact it has occurred, is important for metrology purposes. In one exemplary embodiment of a touch trigger probe, a deflectable stylus is connected to an electrical switch and the probe (trigger) event occurs when the switch is opened (thereby breaking an electrical circuit) due to deflection of the stylus. The time at which the probe event occurred is thus the key piece of information that allows that probe event to be analysed to enable the positon of a point on the surface of an object to be established. A touch trigger probe is therefore not a sensor device that can be polled periodically for measurement values, but a device arranged to report an (asynchronous) probe event that could occur at any point in time. This is why, prior to the present invention, it was always thought necessary to provide a probe interface that generated a SKIP signal a certain invariant time after a probe event was detected. This allowed the controller of the machine tool to record machine position data (i.e. describing the location of the touch trigger probe within the machine tool) on receipt of the SKIP signal. Although this relied on also establishing a positional correction to account for the (invariant) delay between the probe event and the SKIP signal being processed by the numerical controller to latch machine position data, this was always thought to be sufficiently accurate. It is only the present inventors who have realised that such a technique (which relies on the machine tool moving at a constant velocity in the interval between the probe event and the receipt of the SKIP signal by the numerical controller) can introduce measurement inaccuracies.

As explained above, the communications link between the touch trigger probe and the probe interface may comprise a digital wireless transmission system (e.g. a spread spectrum radio link). However, unlike prior art systems, the machine tool communication portion of the probe interface of the present invention outputs the probe event information as digital data packets. Probe event information (e.g. trigger event information) is thus output to the numerical controller of the machine tool digitally, for example over a digital data bus such as an industrial Ethernet or Fieldbus connection. As explained below, this allows probe event information to be sent as timestamped digital data packets in which the timestamp for a probe event relates to a time that is known by the numerical controller. Alternatively, it allows probe event information to be provided to the numerical controller in the form of digital data packets that describe machine position data related to the instant the probe event occurred. The present invention thus overcomes measurement accuracy problems associated with prior art touch trigger probe interfaces that send probe event information as SKIP signals to the dedicated SKIP input of the numerical controller. The probe interface of the present invention can also be installed more easily than prior art interfaces and has the potential to enable more information to be transferred to and/or from the numerical controller.

For completeness, it should be noted that so-called scanning probes (also termed analogue probes) are also known for use on machine tools. Unlike tough trigger probes, an analogue probe typically provides a continuous measurement (e.g. of stylus deflection) thereby allowing a series of measurement values to be output at pre-defined intervals. WO2005/065884 describes a technique that allows an external computer to receive separate streams of scanning probe data and machine positon data that are synchronised to a common clock. These data streams can then be combined, although this is not performed in real time. The arrangement of WO2005/065884 is not, however, suitable for touch trigger probes where probe events can occur at any point in time.

It is also important to note that the term "machine tool" refers to machines, such as lathes and machining centres, that are primarily used to cut material but can be equipped with a measurement probe system to measure workpieces for inspection or set-up purposes. Such machine tools operate under the control of a numerical controller that runs the various cutting and inspection programs. The touch trigger probe interface of the present invention is thus an additional component that can be interfaced to the numerical controller of the machine tool to add measurement functionality. Machines tools are thus quite different to dedicated measuring machines, such as inspection robots or coordinate measuring machines (CMMs), that are built to provide only a measurement function.

Advantageously, the machine tool communication portion is configured to communicate with a numerical controller over a digital data bus. In other words, the machine tool communication portion comprises a digital bus interface. The digital data packets (i.e. containing the probe event information) are thereby passed to the numerical controller over the digital data bus. The digital data bus may be an industrial Ethernet connection. The digital data bus may be a so-called real-time or high speed Ethernet connection. The digital data bus may be a so-called Fieldbus. It should be noted that although the digital data bus may comply with a certain internationally defined standard (e.g. Ethernet etc) it could be a bespoke (manufacturer specific) data bus.

Preferably, each digital data packet comprising probe event information includes a time stamp indicating a time the probe event occurred. In other words, the digital message or data packet issued by the probe interface to the numerical controller preferably indicates not only that a probe event has occurred but also includes timing information about when that probe event occurred. The timestamp thus indicates when the probe event (e.g. trigger event) occurred with respect to the position of the machine axes. The digital data packets may include additional information, for example to allow different types of probe event or different probe events to be distinguished from one another.

The probe interface advantageously has access to timing information from the numerical controller. In this manner, the timestamp can relate to a clock time known to the numerical controller. Preferably, the machine tool communication portion is configured to receive timing data from the numerical controller of the machine tool (e.g. over the digital data bus). The machine tool communication portion may receive such data in a variety of ways. For example, the received timing data may be in the form of a series of digital data packets sent by the numerical controller at known intervals (e.g. regularly defined intervals). Alternatively, the timing data may comprise a clock message (e.g. series of clock messages) that is received from the numerical controller (e.g. over the digital data bus). For example, the probe interface may receive master clock or world time information from the numerical controller of the machine tool. A timing signal could also be passed to the numerical controller from a master clock that is external to the machine tool (e.g. provided in the probe interface).

Conveniently, the machine tool communication portion is configured to receive machine position information in the form of digital data packets. In other words, the numerical controller of the machine tool may send digital data packets to the machine tool communication portion of the probe interface. These data packets can describe the machine position data at a particular instant in time. The digital data packets describing the machine position data may be sent by the numerical controller at defined (e.g. regular) intervals. In other words, the received machine position information conveniently comprises a series of machine position data values output by the numerical controller of the machine tool. The probe interface may comprise a buffer (e.g. a rolling buffer) to store received machine position information. For example, the buffer may store a plurality of the machine position data values received by the machine tool communication portion.

Advantageously, the probe communication portion is configured to receive machine position data directly from position measurement devices (e.g. position encoders) of the machine tool. Although such direct access to the measurements acquired by the position measurement devices is advantageous, such an arrangement requires the machine tool to be appropriately configured to allow such access. However, not all machine tools will provide such access.

If the probe interface receives machine position information, it can define a probe event in terms of the machine position where that event occurred. In other words, the time critical information is provided to the numerical controller in the form of a position that defines a probe event rather than a time that event occurred. The digital data packets output by the machine communication portion to report probe event information may thus conveniently describe a machine position at which the probe event occurred. A buffer to record previously measured machine position data can thus be provided in the probe interface and/or the numerical controller of the machine tool (as described below).

Although the machine tool communication portion outputs probe event information to the numerical controller (e.g. over the digital data bus) it can also send additional (e.g. non-time critical) data to the numerical controller. For example, temperature or probe status data may be passed to the numerical controller.

The touch trigger probe may monitor for the occurrence of a single probe event, such as a trigger event in which a certain positional relationship with a surface is reached. The probe event information may thus comprise a trigger event that indicates the touch trigger probe has reached a predefined positional relationship with an object. Alternatively, the touch trigger probe may establish when any one of a plurality of different probe events occur. For example, different probe events may occur when different positional relationships with an object are attained. For example, as explained in more detail below, a trigger and confirm measurement process may be implemented.

The probe communication portion of the probe interface may be of any known type. It may provide a wired connection to a touch trigger probe. Advantageously, the probe communication portion comprises a wireless communications portion for wireless communication with an associated touch trigger probe. The wireless link may be an optical link. The wireless link may be a radio link.

According to a second aspect of the invention, a touch trigger probing system is provided that comprising a touch trigger probe interface according to the first aspect of the invention and a touch trigger probe. The touch trigger probe preferably has a transmission portion for transmitting probe event information to the probe communication portion of the touch trigger probe interface. The touch trigger probe and probe communication portion of the probe interface may thus be of known type.

The touch trigger probe may be of any type. The touch trigger probe may be a non-contact touch trigger probe. For example, the touch trigger probe may be a non-contact toolsetter. The touch trigger probe may be a contact touch trigger probe. For example, the touch trigger probe may comprise a deflectable stylus. The touch trigger probe may be used for workpiece measurement or cutting tool measurement. The touch trigger probe may be mountable in the spindle of a machine tool. In other words, the touch trigger probe may be a spindle mountable touch trigger probe. The touch trigger probe may be mountable to the bed of a machine tool. The touch trigger probe may be mountable to a lathe.

According to a third aspect of the invention, a machine tool system is provided that comprises a machine tool having a numerical controller. A touch trigger probe interface according to a first aspect of the invention may also be provided. The machine tool may also comprise a touch trigger probing system according to the second aspect of the invention. A rolling buffer may be provided that stores a plurality of machine position data values. Advantageously, the numerical controller of the machine tool includes a rolling buffer that stores a plurality of machine position data values. As explained in more detail below, this allows machine position to be found at the time defined in a timestamped probe event message received from the probe interface.

Also described herein is touch trigger probe interface for a machine tool, comprising a probe communication portion for receiving probe event information from a touch trigger probe and a machine tool communication portion for outputting probe event information to a numerical controller of the machine tool, wherein the output portion outputs probe event information in the form of time stamped digital data.

Also described herein is a touch trigger probe interface for a machine tool. The probe interface may comprise a probe communication portion for receiving probe event information from a touch trigger probe. The probe interface may include a machine tool communication portion for outputting probe event information to a numerical controller of the machine tool. The machine tool communication portion may output the probe event information as digital data packets. The machine tool communication portion may output the probe event information over a digital data bus. The probe interface may include any one or more of the individual features, alone or in combination, that are described herein.

Also described herein is a method for communicating probe event information from a touch trigger probe interface to the numerical controller of a machine tool. The method comprises the step of the probe interface passing the probe event information to the numerical controller in the form of one or more digital data packets. The method may include any of the apparatus, or any of the uses of the apparatus, that are described herein.

Figure 2:
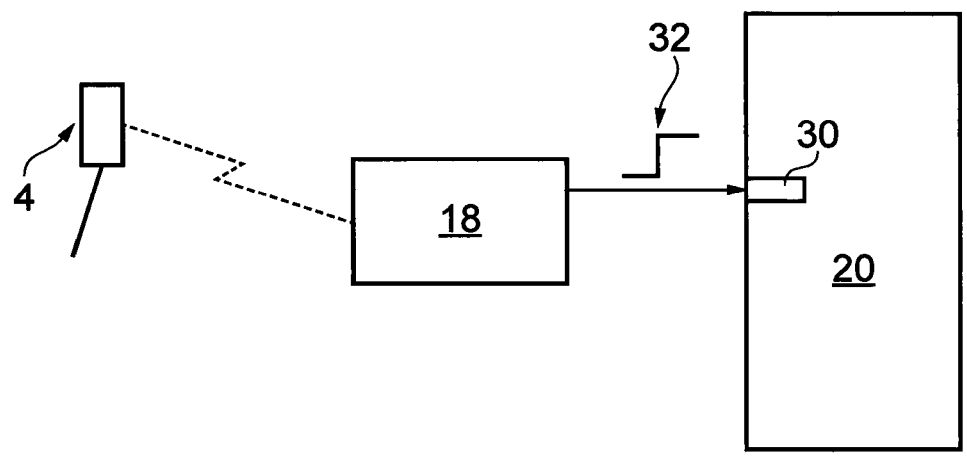
Figure 3:
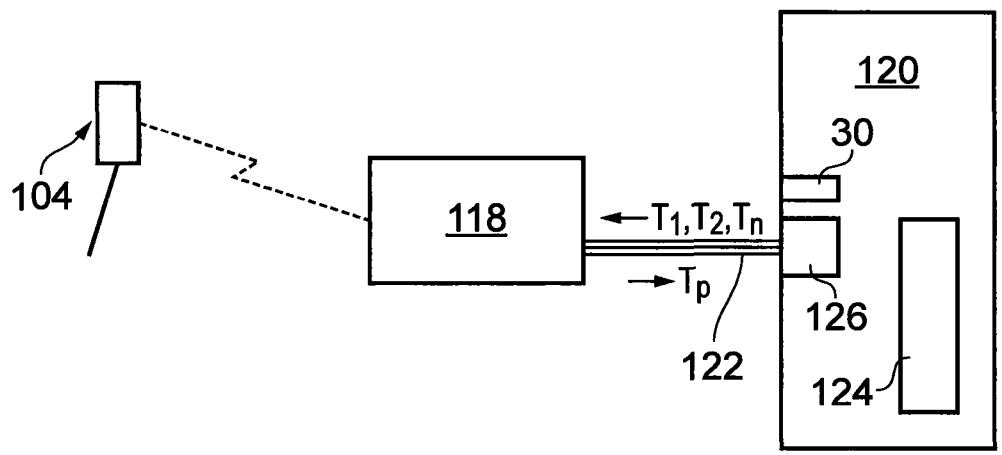
Figure 4:
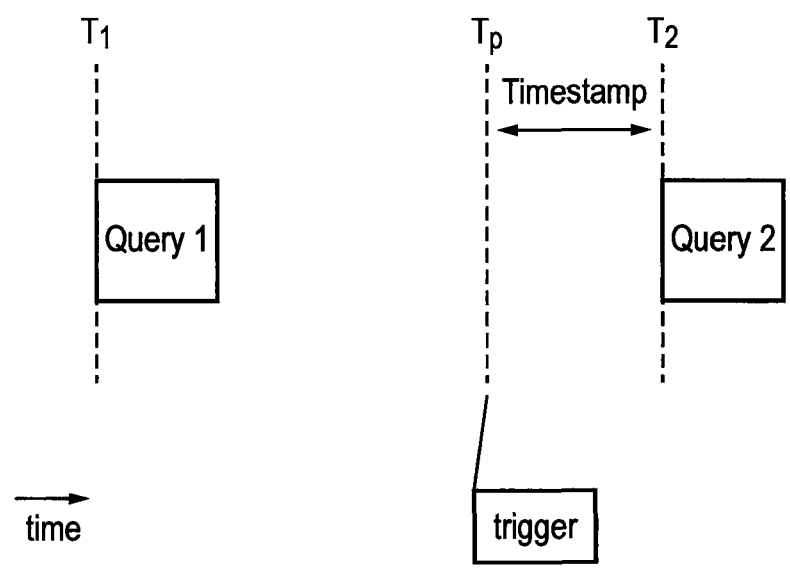
Figure 5:
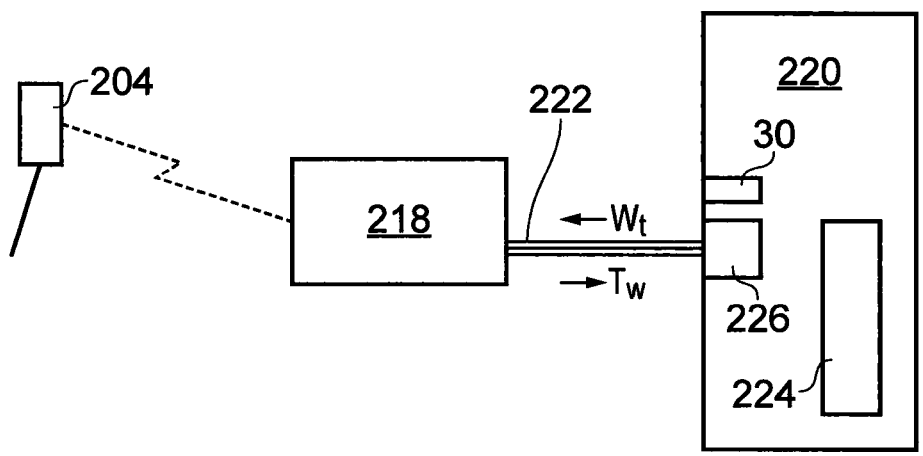
Figure 6:
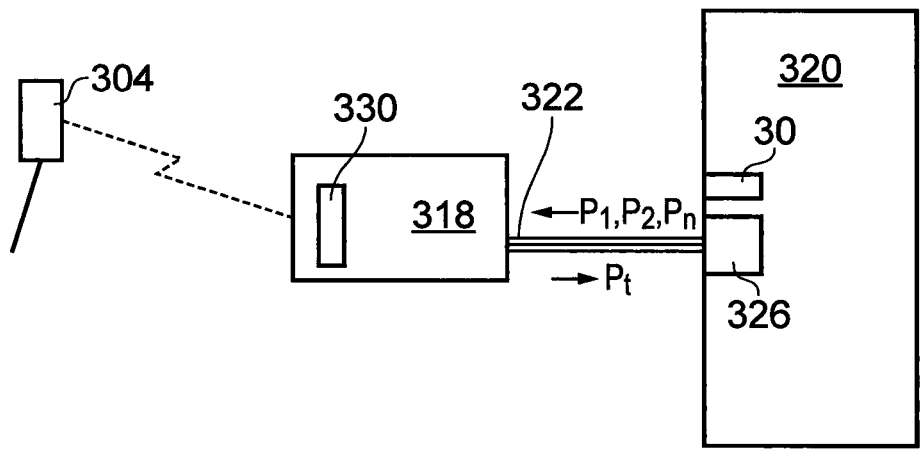
Figure 7:
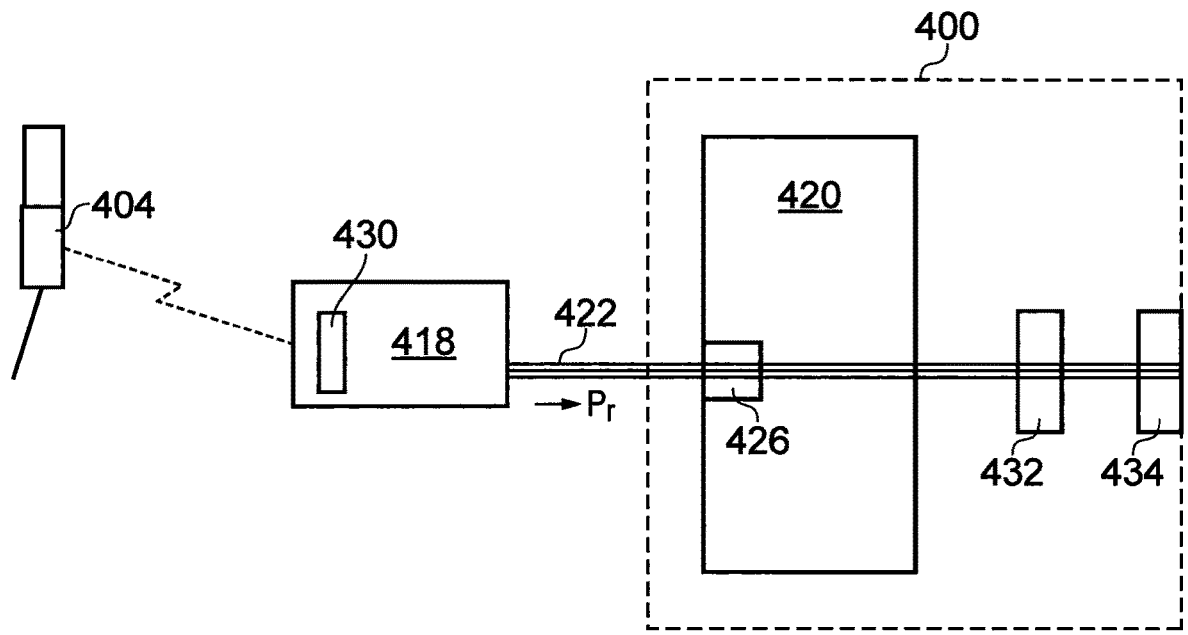
Figure 8:
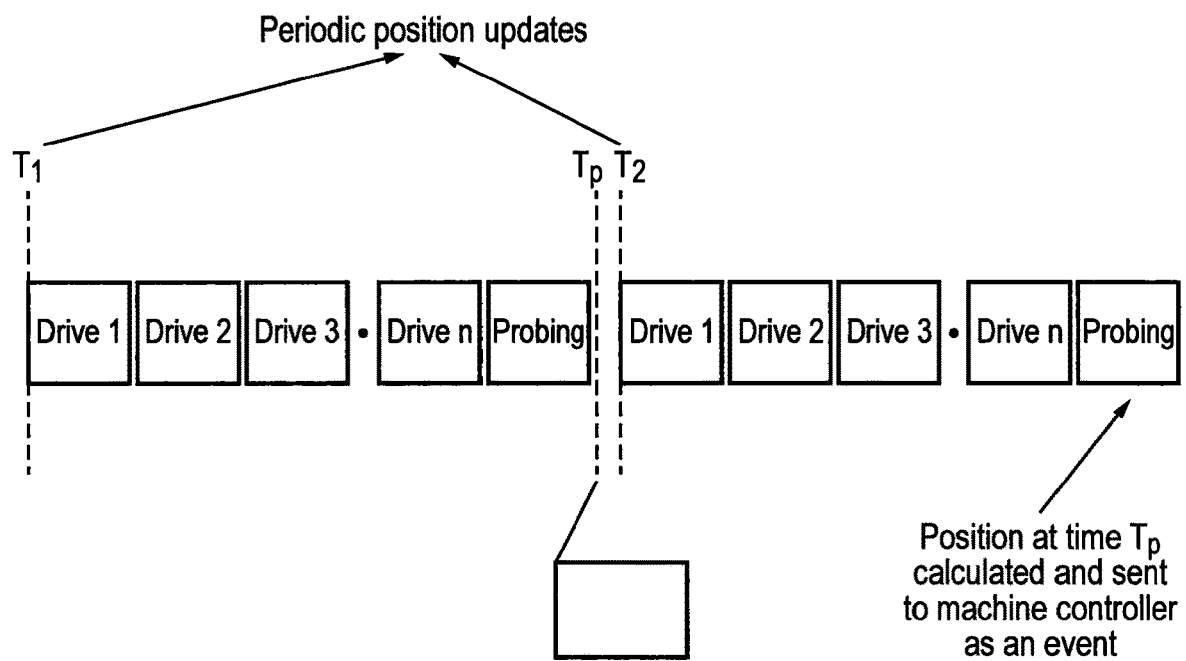

The invention will now be described, by way of example only, with reference to the accompanying drawings in which;

FIG. 1 shows a machine tool and measurement probe apparatus of the prior art, FIG. 2 shows the connection between the probe interface and NC of the machine tool in the prior art system of FIG. 1 in more detail, FIG. 3 shows a first embodiment of the invention in which time stamped probe event information is output to the NC of a machine tool over a Fieldbus, FIG. 4 shows how the time stamped information of FIG. 3 can be produced, FIG. 5 shows a second embodiment in which the probe interface is configured to receive a clock signal from the NC over an industrial Ethernet link, FIG. 6 shows a third embodiment in which the probe interface receives position information over an industrial Ethernet link, FIG. 7 shows a fourth embodiment in which the probe interface is directly connected to the drive control bus of the machine tool, and FIG. 8 shows in more detail the bus configuration of FIG. 7.

Referring to FIG. 1, a machine tool 1 is schematically illustrated having a spindle 2 holding a touch trigger probe 4.

The machine tool 1 includes various motors 8 for moving the spindle 2 relative to a workpiece 6 located on a workpiece holder 7 within the work area of the machine tool. The location of the spindle within the work area of the machine is accurately measured in a known manner using encoders 9; such encoder measurements provide "machine position data" in the machine coordinate system (x,y,z). A numerical controller (NC) 20 of the machine tool controls (x,y,z) controls movement of the spindle 2 within the work area of the machine tool and also receives information (i.e. machine position data) from the various encoders describing the present spindle position. The term numerical controller as used herein should also be understood to mean any part of the numerical control system of the machine tool; e.g. it could include a programmable logic controller (PLC) and drive controllers etc. It should be noted that the terms numerical controller (NC), machine tool controller and controller are used interchangeable herein, unless stated otherwise.

The touch trigger probe 4 comprises a probe body 10 that is attached to the spindle 2 of the machine tool using a standard releasable shank connector. The probe 4 also comprises a workpiece contacting stylus 12 that protrudes from the housing. A stylus ball 14 is provided at the distal end of the stylus 12 for contacting the associated workpiece 6. The touch trigger probe 4 generates a so-called trigger signal when deflection of the stylus exceeds a predetermined threshold. The probe 4 comprises a wireless transmitter/receiver portion 16 for passing the trigger signal to a corresponding wireless receiver/transmitter portion of a probe interface 18. The wireless link may be, for example, RF or optical. In this embodiment, a spread spectrum radio link as described in WO2004/057552 is provided. The NC 20 receives the machine position data (x,y,z) from the encoders 9 and, as will be described in more detail below, also has a SKIP input line for receiving a trigger signal (also termed a SKIP signal) from the probe interface 18. This SKIP input allows the machine position data (x,y,z) describing the position of the spindle in the machine coordinate system to be recorded at the instant the probe interface issues a trigger signal to the SKIP input. After appropriate calibration, this allows the position of individual points on the surface of objects, such as the workpiece 6, to be measured. For completeness, it should also be noted that the SKIP input may be given a different name on different brands of numerical controller.

Referring to FIG. 2, the prior art technique for passing a trigger signal from the probe interface to the controller 20 described with reference to FIG. 1 is illustrated in more detail.

As explained above, an output from the probe interface 18 is connected to the SKIP input 30 of the controller. The probe interface 18 thus outputs a SKIP or trigger signal 32 to the SKIP input 30 of the controller when it receives a trigger signal from the touch trigger probe 4. In particular, the probe interface 18 raises the voltage level applied to the SKIP input 30 of the controller 20 to indicate that a trigger event has occurred. The controller 20 thus monitors its SKIP input 30 and in response to the SKIP signal 32 (i.e. in response to the rising edge associated with the change in voltage of the signal line) it records the current machine position data (x,y,z) and stops further motion of the touch trigger probe.

As mentioned above, the probing system (i.e. the measurement probe and the probe interface) does not instantaneously generate a SKIP signal. There will always be some delay between the trigger event (e.g. the stylus making contact with the object) and the issuance of the SKIP signal. So long as the delay is constant, it is possible to calculate a positional correction to account for the delay. However, as explained above, this positional correction is calculated on the assumption that the touch trigger probe is moving with a constant velocity in the period of time between the trigger event and the issuance of the SKIP signal. In practice, it has been found that this assumption is not always correct. In particular, changes in velocity may occur in the period between the trigger event and the issuance of the SKIP signal. This has been found to result in a measurement error being introduced by virtue of the need to assume constant velocity to calculate the positional correction.

The present invention alleviates the above mentioned problem by implementing a solution in which the trigger signal is communicated to the controller of the machine tool without using the SKIP input. As will be explained below, each trigger signal is instead passed from the probe interface to the controller in the form of a digital data packet. In particular, the trigger event information is passed as digital data over an industrial Ethernet connection (e.g. a Fieldbus) to the controller of the machine tool. As also explained below, the trigger event information contained in the digital packets may be timestamped relative to timing signals received from the controller. These timestamps may be derived from periodic timing messages specifically sent to the probe interface or by giving the probe interface access to the controller clock over the bus. Alternatively, the probe interface may receive positional information collected at known times relative to the controller clock and use such position information to establish the actual machine position at the instant the trigger event occurs. These techniques avoid the need to determine a positional correction to account for the delays present in the prior art systems and allow the actual position at which a trigger event occurred to be established. This removes the errors that can occur in the prior art technique due to velocity variations. Furthermore, connecting the probe interface to the controller over a bus allows other information (e.g. non-time critical) information to be passed between the probe interface and the controller.

Referring to FIG. 3, a first embodiment of the present invention is illustrated. In particular, the arrangement shown in FIG. 3 replaces the prior art arrangement of probe interface and controller described in FIGS. 1 and 2.

A numeric controller 120 is provided that is connected to a probe interface 118 over a Fieldbus 122. A touch trigger probe 104 communicates with the probe interface 118 over a wireless radio link, such as the radio link described in WO2004/057552. The numeric controller 120 includes appropriate Fieldbus hardware including a network port 126 to which the probe interface is connected. The NC 120 is the Bus Master and the probe interface 118 the slave device. The numeric controller 120 also includes a memory store or buffer 124 that stores a rolling series of machine position data (i.e. data indicating the position of the touch trigger probe in the machine coordinates).

In use, the NC 120 continually sends a series of digital messages (T1, T2, ... Tn) to the probe interface 118 over the Fieldbus. These messages are sent at regular time intervals (T2-T1) and provide both ends of the data link with a synchronisation (timing) reference. In other words, the probe interface 118 is provided with timing information that allows it to establish when an event occurred relative to a timing event that was generated by the NC 120. When a trigger event occurs, the probe interface 118 calculates a timestamp (relative to the synchronisation reference timings). The fact a trigger event has occurred and the timestamp that describes when that trigger event occurred is sent to the NC 120 by the probe interface 118 over the Fieldbus as a digital data packet (Tp).

Referring additionally to FIG. 3, the timestamping technique is illustrated in more detail. In particular, timed messages T1 and T2 issued by the NC 120 and received by the probe interface 118 are illustrated. The receipt of these messages by the probe interface 118 allows the probe interface 118 to establish the time the trigger event (Tp) occurred relative to the timed message T2. The probe interface 118 can then create and send a timestamped message to the NC 120 that describes when the trigger event (Tp) occurred relative to the timed message T2. As the NC 120 issued the timed message T2 at a known time relative to its local clock, it can then establish when the trigger event (Tp) occurred in it local controller clock time.

The NC 120 receives the data and knows, by virtue of the timestamp, when the trigger event occurred in its local (controller) time. The buffer 124 can then be interrogated to obtain the machine position at the instant the trigger event occurred. In particular, the machine position data points stored within the buffer 124 that were collected around the relevant time period can be used to line fit and interpolate the machine position related to the timestamp value. This allows the position of the point on the surface of the object that was contacted by the stylus of the touch trigger probe to be established.

The probe interface 118 may send only time-stamped trigger event messages to the NC 120, for example indicating when the probe changes between a trigger and un-triggered state. However, it is also possible for the probe interface 118 to send additional information to the NC 120 over the Fieldbus. The other information may be non-time critical data, such as probe battery status, measured temperature, probe filter settings, confidence values etc. This additional metadata may be tagged to the time stamped digital data packets that report the trigger event. The probe interface 118 may also receive information from the NC over the Fieldbus.

The probe interface 118 may also be arranged to send different types of time critical probe event data to the NC 120. For example, the probe interface 118 may be configured to receive a plurality of different types of probe event messages from the associated touch trigger probe.

For example, if the touch trigger probe 104 is a strain gauge touch trigger probe (e.g. as described in EP1880163) it could be configured to send more than one type of probe event information to the probe interface 118. For example, a high sensitivity trigger threshold could be set (which is more likely to result in issuance of a false trigger) that generates a first type of trigger event. A lower sensitivity threshold could also be set (which is less preferred for metrology accuracy but less likely to result in false triggers) that generates a second type of trigger event. The probe interface 118 could then send digital data packages to the NC 120 that identify the type of trigger event that had occurred (e.g. a trigger event of the first or second type) along with the time stamp that defines when the event occurred. This allows the NC 120 to distinguish between different trigger events and act accordingly. Multiple different types of probe event information, such as the above described different trigger events, could be sent to the NC 120 in this manner.

Following on from the above, it would also be possible to implement a confirmation based measurement process. For example, consider a very sensitive touch trigger probe and machine tool combination that requires a filter to be implemented before a reliable trigger signal can be generated. Typically, such a filter would be time-based (e.g. set to 8 ms or 16 ms) and would require the touch trigger probe to remain triggered for this filter duration before the trigger signal is issued. Instead of waiting for the filter duration before issuing the trigger signal, the touch probe could inform the probe interface 118 when a potential trigger is first detected without applying the filter; this could be termed a first probe event and a first time stamped message could be sent to the NC 120 to report this first probe event has occurred.

The touch probe could then also inform the probe interface 118 when the trigger is confirmed as being a reliable trigger because a trigger event is also produced after application of the filter; this could be termed a second probe event and a second time stamped message could be sent to the NC 120 to report this second probe event has occurred. It would also be possible for the confirmation message to be sent to NC without a time stamp; i.e. only the first probe event describing when the initial trigger event is detected may be time stamped. The NC 120 could thus establish the machine position data associated with the first probe event, but only use this data to report a measurement point if the second (confirmation) probe event is subsequently received. The probe interface 118 may optionally also include a connection to the SKIP input of the NC 120 for safety (not measurement) or backward compatibility purposes. For example, the probe interface may also send a SKIP signal to the SKIP input of the controller when a trigger is confirmed purely to ensure the machine tool motion is halted at this point. This may be provided as a safety feature in addition to the NC 120 being programmed to halt machine motion in response to a probe event being reported by the probe interface 118 over the Fieldbus.

It should also be noted that the timestamp applied to the message sent to the NC 120 by the probe interface 118 may take account of any variations in the delay associated with passing probe event information from the touch probe 104 to the probe interface. As explained in more detail in WO2004/057552, a radio protocol has previously been employed in which the output of a trigger signal to the SKIP input of a controller is delayed by a constant time (e.g. 10 ms from a touch event) to ensure radio signal integrity whilst ensuring a repeatable low-jitter response from the probing system. In particular, WO2004/057552 describes a radio protocol in which the constant 10 ms delay enables the re-transmission of radio messages from the probe to the probe interface. For example, if a first radio transmission does not get through, a second re-transmission is made (e.g. 2 ms later) and a third re-transmission occurs (e.g. 2 ms later) if the second one fails. In the majority of cases where the radio signal is good, the signal is received correctly first time by the probe interface and this scheme thus imposes an unnecessary 10 ms delay. This radio protocol could thus be adapted for use with the present invention by configuring the probe interface 118 to take account of any delay due to re-transmission when calculating the time of the probe event. The need for the interface to impart a constant 10 ms delay before the probe event is communicated to the NC 120 is thus avoided.

It should be noted that non-time critical information may also be transmitted from the probe interface 118 to the NC. For example, temperature information or probe status information (e.g. battery, filter, performance) data. The occurrence of such a non-time critical event may be communicated to the probe interface 118 over the wireless link and then passed to the NC 120 over the Fieldbus as a digital data packet. The NC 120 could then warn the operator (e.g. to replace a battery) and/or perform a recalibration routine.

Referring to FIG. 5, a variant of the technique described above with reference to FIGS. 3 and 4 will be described. A numeric controller 220 is provided that is connected to a probe interface 218 over an industrial Ethernet bus 222. A touch trigger probe 204 communicates with the probe interface 218 over a wireless radio link, such as the radio link described in WO2004/057552. The numeric controller 220 includes appropriate industrial Ethernet hardware including a network port 226 to which the probe interface 218 is connected. The NC 220 is the Bus Master and the probe interface 218 the slave device. The numeric controller 220 also includes a memory store or buffer 224 that stores a rolling series of machine position data (i.e. data indicating the position of the touch trigger probe in the machine coordinates) at know times relative to a Master Clock.

The NC 220 include a communications bus that provides the Master Clock information (which can also be termed World Time, $W_t$) to all devices on the bus. The probe interface 218 thus receives this Master Clock timing data from the NC 220. The probe interface 218 can thus, when a trigger event occurs, time stamp that event with an absolute time value (i.e. the time stamp can be defined in World Time). The probe interface can then send the time stamped trigger event information ($T_w$) over the Industrial Ethernet to the NC 220. The machine position data points stored within the buffer 224 immediately around the timestamp value can then be used to interpolate (or calculate using another suitable technique) the absolute position at which the trigger event occurred.

Referring to FIG. 6, a further embodiment of the invention is illustrated. A numeric controller 320 is provided that is connected to a probe interface 318 over a Fieldbus 322. A touch trigger probe 304 communicates with the probe interface 318 over a wireless radio link, such as the radio link described in WO2004/057552. The numeric controller 320 includes appropriate Fieldbus hardware including a network port 326 to which the probe interface 318 is connected. The NC 320 is the Bus Master and the probe interface 318 the slave device. The probe interface 318 also includes a memory store or rolling buffer 330 that stores a rolling series of machine position data received from the NC 320 over the Fieldbus 322.

In use, the NC 320 is programmed (e.g. through the use of G-codes or similar instructions) to send a regular stream of machine position data (P1, P2, P3) over the Fieldbus 322 to the probe interface 318. The probe interface 318 stores this machine position data in a rolling buffer 330. The probe interface 318 also timestamps or other relates each received set of machine position data relative to its local clock. When the probe interface 318 receives a trigger event from the touch trigger probe 304, this trigger event is also time-stamped relative to the local clock. The machine position data in the rolling buffer 330 and the trigger event are thus synchronised to a common (local) clock, which allows the probe interface to calculate machine position data (Pt) at the time the trigger event occurred. This machine position data (Pt) describing the position of the probe (trigger) event is then sent by the probe interface 318 to the NC 320 over the Fieldbus 322.

It should also be noted that the NC may be programmed to perform the above described tasks in a variety of way. The NC may be instructed to output a stream of data to the probe interface using instructions incorporated into the NC by the machine tool manufacturer or by user embedded code. For example, the user may embed suitable code using compile cycles or synchronous actions. The exact way this is done will thus be dependent on the specific type or configuration of machine tool that is being used.

Referring to FIGS. 7 and 8, it will be explained how the present invention could also be implemented on machine tools where the probe interface shares the bus that is also used to control the various drives of the machine tool.

FIG. 7 shows a machine tool 400 having a numeric controller 420. The NC 420 is connected to a probe interface 418 over an industrial Ethernet bus 422. A touch trigger probe 404 communicates with the probe interface 418 over a wireless radio link, such as the radio link described in WO2004/057552. It should be noted that the touch trigger probe 404 would be mounted to the machine tool in use and FIG. 7 shows it separately merely to enable the configuration to be explained. The numeric controller 420 includes appropriate bus hardware including a network port 426 to which the probe interface 418 is connected. The NC 420 is the Bus Master and the probe interface 418 the slave device. The probe interface 418 also includes a memory store or rolling buffer 430. In this embodiment, the Industrial Ethernet system 422 is connected to not only the probe interface 418 and possibly other external device, but also to the motorised drives 432 and position encoders 434 of the machine tool itself.

The probe interface 418 is configured to monitor the bus 422 for all communications (not just those that are directed at the probe interface). The probe interface thus logs data associated with the drives 432 and the encoders 434. When a probe event occurs (e.g. seated-to-triggered or triggered-to-seated), a timestamp relative to clock points T1, T2 or "ticks" used by the bus is generated. Using the drive data points received around the probe event, the probe interface 418 calculates (e.g. by interpolation) a raw machine position ($P_r$) associated with that probe event. This raw machine position ($P_r$) is then passed to the NC 420 over the bus 422.

It should be noted that machine position data collected over the bus in this way (e.g. collected directly from the encoders 434) is termed raw data because the NC 420 typically stores various corrections that are applied to the raw data (e.g. generated during machine tool calibration) to increase the positional accuracy of that data. The probe interface 418 does not, in this embodiment, have access to such calibration data and hence can only report a raw machine position ($P_r$) associated with that probe event to the NC 420. The NC 420 can, however, then apply the appropriate corrections to the raw machine position ($P_r$) to generate a corrected machine position value. As an alternative, calibration data could be passed to the probe interface 418 by the NC 420, or the probe interface 418 could be programmed with calibration data calculated separately. For example, the raw machine position data could be manipulated using machine mapping data (such as that obtained using a Renishaw XM60) to produce an absolute position and this "real" position sent to the NC 420 over the bus 422.

It should be noted that the above description merely provides some examples of the ways in which the invention could be implemented. In particular, any type of bus or digital interface could be used to enable the communication link between the machine tool controller and the probe interface. Although a spindle mounted touch trigger probe is shown, the invention would work with any touch trigger probe. For example, tool setting or table mounted touch trigger probes could be used. The touch trigger probe could also be a so-called non-contact probe. For example, it may comprise a non-contact toolsetter in which a beam of light is broken or unbroken by a tool to generate a trigger signal.

The invention claimed is:

1. A touch trigger probe interface configured to interface a touch trigger probe to a machine tool, the touch trigger probe interface comprising a probe communication portion configured to receive probe event information from the touch trigger probe and a machine tool communication portion configured to output probe event information to a numerical controller of the machine tool, wherein the machine tool communication portion outputs the probe event information as digital data packets comprising timing information about when a probe event occurred.

2. An interface according to claim 1, wherein the machine tool communication portion is configured to communicate with the numerical controller over a digital data bus, the digital data packets being passed to the numerical controller over the digital data bus.

3. An interface according to claim 2, wherein the digital data bus is an industrial Ethernet connection.

4. An interface according to claim 1, wherein each digital data packet comprising probe event information includes a time stamp indicating a time the probe event occurred.

5. An interface according to claim 1, wherein the machine tool communication portion is configured to receive timing data from the numerical controller of the machine tool.

6. An interface according to claim 5, wherein the received timing data is in the form of a series of digital data packets sent by the numerical controller at regularly defined intervals.

7. An interface according to claim 5, wherein the timing data comprises a clock message that is received from the numerical controller.

8. An interface according to claim 1, wherein the machine tool communication portion is configured to receive machine position information in the form of digital data packets.

9. An interface according to claim 8, comprising a buffer to store received machine position information.

10. An interface according to claim 8, wherein the received machine position information comprises a series of machine position data values output by the numerical controller of the machine tool.

11. An interface according to claim 8, wherein the probe communication portion is configured to receive machine position data directly from position measurement devices of the machine tool.

12. An interface according to claim 8, wherein the digital data packets output by the machine communication portion to report probe event information describe a machine position at which the probe event occurred.

13. An interface according to claim 1, wherein the machine tool communication portion outputs additional data to the numerical controller.

14. An interface according to claim 1, wherein the probe event information comprises a trigger event that indicates the touch trigger probe has reached a predefined positional relationship with an object.

15. An interface according to claim 1, wherein the probe communication portion comprises a wireless communications portion for wireless communication with an associated touch trigger probe.

16. A touch trigger probing system, comprising a touch trigger probe interface according to claim 1 and a touch trigger probe, the touch trigger probe having a transmission portion for transmitting probe event information to the probe communication portion of the touch trigger probe interface.

17. A system according to claim 16, where the touch trigger probe comprises a deflectable stylus.

18. A system according to claim 16, wherein the touch trigger probe is a spindle mountable touch trigger probe.

19. A system according to claim 16, wherein the touch trigger probe comprises a non-contact tool-setter.

20. A machine tool system comprising a machine tool having a numerical controller and a touch trigger probe interface according to claim 1 or a touch trigger probing system, comprising a touch trigger probe interface according to claim 1 and a touch trigger probe, the touch trigger probe having a transmission portion for transmitting probe event information to the probe communication portion of the touch trigger probe interface.

21. A machine tool system according to claim 20, wherein the numerical controller includes a rolling buffer that stores a plurality of machine position data values.

* * * * *